Nov. 20, 1934.  G. F. ROTH  1,981,251

THERMOSTAT FOR AQUARIUMS

Filed Aug. 28, 1931

Inventor
George F. Roth

Patented Nov. 20, 1934

1,981,251

UNITED STATES PATENT OFFICE 1,981,251

THERMOSTAT FOR AQUARIUMS

George F. Roth, Chicago, Ill.

Application August 28, 1931, Serial No. 559,916

5 Claims. (Cl. 219—20)

This invention relates to physico-responsive control methods and means, and more especially to temperature stabilizing apparatus of the electro-thermostatic variety.

The main objects of the invention are to provide an improved and more dependable control system of the character referred to; to provide positively for confining the physico-variant condition within predetermined limits; to provide positively for maintaining the temperatures of a chosen fluid medium within a selected range, and especially below a certain maximum permissible temperature, as for instance, the water in a fish aquarium.

An illustrative embodiment of this invention is shown in the accompanying drawing, in which Figure 1 is a fragmentary perspective view of an aquarium with a temperature control device mounted on the front edge of the tank, the electric heater element being shown disconnected at the plug attachment.

In aquariums where tropical fish are kept, the temperature of the water must be maintained within a certain relatively narrow range. Heretofore, in order to accomplish this result, it has been customary to employ a thermostatic controller to open and close an electrical heating circuit. However, the contacts have sometimes failed to operate because they "freeze" or adhere abnormally, and will not "break contact." This causes the water in the aquarium to reach a temperature which exceeds the maximum temperature at which the fish will live, thereby killing them. Applicant has provided a system of thermostats comprising a primary thermostat and a secondary thermostat. The secondary thermostat is interrelated with the primary thermostat and is adjusted to operate at a temperature slightly higher than the closing temperature of the primary thermostat. This will operate an electro-magnetic vibrator which will free the "frozen" or adhered contact by means of a vibratory arm.

Figure 3:
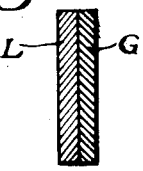
Fig. 3 is an enlarged section on the line 3—3 of either thermostat as shown in Fig. 2.

Referring more in detail to the drawing a bimetallic U-shaped thermostat 1, herein referred to as the primary thermostat, is fixedly mounted on a vertical support 2 and comprises a movable arm 3 the free end of which has a contact 4 mounted thereon. The thermostat comprises an inner strip G and an outer strip L, (shown in Fig. 3), the strip or element located on the outer side having the lesser coefficient of expansion.

Figure 1:
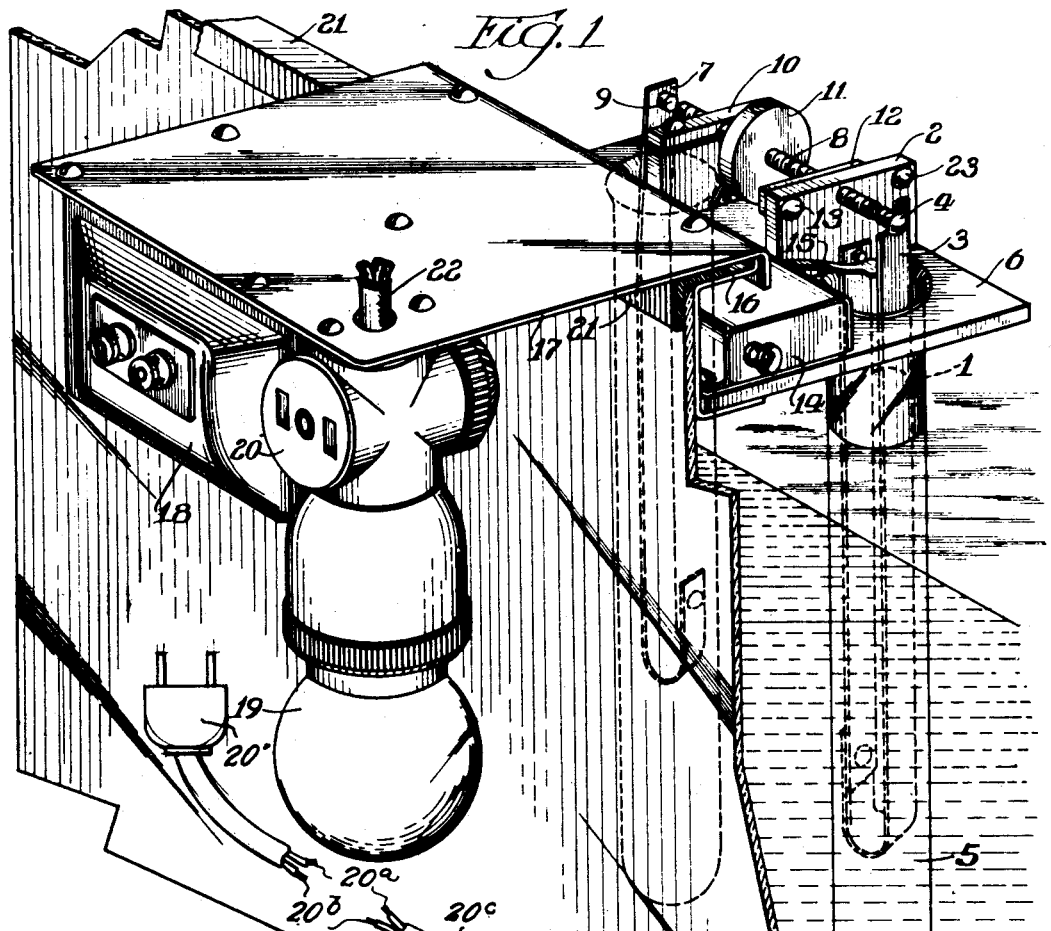

This thermostat 1 is encased in a glass tube 5 which is immersed in the water of an aquarium as shown in Fig. 1, said tube 5 being carried by a dielectric support 6 and held in position by the bottom edge of support 2 which overlaps the rim of the tube.

A thermostat 7, herein referred to as the secondary thermostat, is also mounted on the support 6 and is identical in structure and arrangement of parts with the thermostat 1, with the exception that the element having the lesser coefficient of expansion is located on the inner side of the bimetallic strip.

Figure 2:
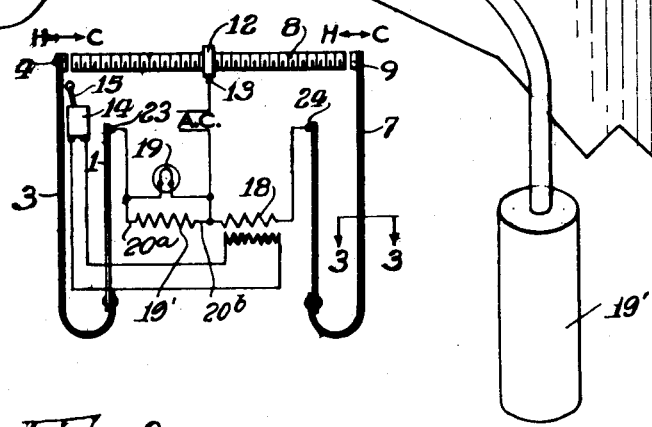
Fig. 2 is a circuit diagram of the temperature control device.

An adjustable screw contact member 8 operatively common to both of the contacts 4 and 9 on the thermostats 1 and 7 is threaded into the supports 2 and 10. (See Fig. 1.) An adjusting disk 11 is fixedly mounted on the contact member 8 between supports 2 and 10 for manual adjustment according to the temperature range desired. Moving the member 8 to the right, on Fig. 2, raises the temperature range and vice versa.

The contact 8 is also threaded into a stationary plate 12 which serves as an electrical connection between the binding post 13 on the support 2 and the contact member 8.

There is also mounted on the support 6 an electro-magnetic vibrator 14 having an arm 15 for tapping action against the arm 3. Said vibrator is controlled by the thermostat 7.

The support 6 is mounted on the lower portion of a two piece clamping bracket which consists of a lower portion 16 and an upper portion 17, the latter constituting a support for the transformer 18, the light 19 and the socket device 20 adapted for connecting a heater 19' suitable for immersion in water to be heated. This connection is made through a plug 20' to fit socket 20, and a pair of conductors 20a and 20b united in a cable or cord 20c as shown in Fig. 1.

The members 16 and 17 also form a clamp to engage an iron angle bar 21 on the upper edge of the aquarium. The clamping bracket is customarily made in one piece in the prior devices, and as the angle bars on the tops of aquariums are made in different thicknesses, they had to be made in different sizes. Applicant provides a two piece clamping bracket that can be used for any size of angle bar.

The three wires 22 extending from the aperture in the support 17 are connected to the binding post 13, which is connected to the contact 8; the binding post 23, which is connected to the anchored end of the thermostat 1; and the binding post 24 which is indirectly connected through the transformer 18, and the vibrator 14 to the anchored end of the thermostat 7.

If, in operation, it be required that the water in the aquarium be maintained at about 70°, and the temperature of the water drops below that point, the thermo-responsive element 3 draws toward the contact 8, which is so adjusted that the contact 4 on the element 3 engages with the contact 8, and closes an electrical circuit which turns on the heater 19' located at the bottom of the tank. The lamp 19 is connected in parallel with the heater 19' so that as soon as a contact is made at 4—8 the lamp lights showing that the heater is turned on. When the temperature of the water reaches 70° the contact breaks at 4. The process is repeated over again as soon as the temperature of the water recedes. If the contact 4 of the thermostat 1 "freezes" or adheres abnormally to contact 8, as sometimes happens, and does not break contact when the temperature of the water reaches 70° then the thermostat 7 which is set to close at a few degrees higher, swings against the other end of contact 8; and when this contact is made, say at 75°, it closes a vibrator operating circuit. Current now passes through the transformer 18 to the electro-magnetic device 14, causing it to vibrate its arm 15 against the thermo-responsive element 3, breaking the contact 4—8 and thereby opening the heater circuit. Ensuing drop in temperature then breaks the contact made at 8—9 by thermostat 7. If contact 9 sticks the continued operation of vibrator 14 serves as an alarm, whereupon the contact 9 may be broken manually.

It will be apparent that by adjusting the contact 8 so that the gap between the end of the contact 8 and the contact 4 is made smaller, the gap between the other end of contact 8 and contact 9 is made larger. Therefore the thermostats may be set for any definite range of temperature. It will be seen that the danger of "freezing" or abnormal adherence of the heater control contact is now avoided.

Although but one specific embodiment of this invention is herein shown and described, it will be understood that details of the construction and mode of operation set forth may be altered or omitted without departing from the spirit of this invention as defined by the following claims.

I claim:

1. In an aquarium temperature control system, a pair of thermostats comprising bimetallic U-shaped arms having contacts mounted on their free ends, a common contact for said first-mentioned contacts, a heating element controlled by one of said thermostats, and a vibrator controlled by the other of said thermostats, said vibrator having a vibratory arm for engagement with said first-mentioned thermostat.

2. A temperature control system comprising a source of heat, a thermostatic switch operable at a predetermined temperature to control the heat, a second thermostat operable at a relatively higher temperature, and a vibrator controlled by said second thermostat to jar loose the switch contact of the first said thermostat in the event that it adheres abnormally in closed position.

3. A temperature control device comprising a pair of bimetallic thermoresponsive strips each having a movable end responsive to temperature changes, one end of each of said strips having contacts mounted thereon, a contact operatively common to both of said contacts, and an electro-mechanical device responsive to one of said thermostats and operative to release the other thermostat whenever the latter "freezes."

4. A control system comprising primary and secondary physico-responsive members subject to the condition of a medium to be controlled, in combination with medium controlling means and a vibrator, the primary member being operative to control said means and the secondary member being arranged to operate said vibrator indirectly through an electrical circuit, which in turn is arranged to operate on the primary member whenever the latter fails to function normally.

5. In an electrical control system of the class described, a pair of thermostats, a selected electrically controlled physico-responsive work performing element, a signal co-responsive with said element, one of said thermostats being arranged to cause energization of said element and signal at a chosen lower temperature, and the other thermostat being arranged to cause de-energization of said element and signal at another and higher chosen temperature, and electro-mechanical means responsive to and with said other thermostat to positively assure such de-energization by mechanically tapping on the first said thermostat.

GEORGE F. ROTH.